United States Patent

Shimura et al.

(10) Patent No.: US 9,366,535 B2
(45) Date of Patent: Jun. 14, 2016

(54) VIBRATION GYRO ELEMENT, GYRO SENSOR, AND ELECTRONIC APPARATUS

(75) Inventors: Masashi Shimura, Suwa (JP); Takayuki Kikuchi, Okaya (JP)

(73) Assignee: Seiko Epson Corporation (JP)

( * ) Notice: Subject to any disclaimer, the term of this patent is extended or adjusted under 35 U.S.C. 154(b) by 294 days.

(21) Appl. No.: 13/550,903

(22) Filed: Jul. 17, 2012

(65) Prior Publication Data

US 2013/0019681 A1   Jan. 24, 2013

(30) Foreign Application Priority Data

Jul. 21, 2011   (JP) ................................ 2011-159612

(51) Int. Cl.
    *G01C 19/5607* (2012.01)
    *G01C 19/567* (2012.01)

(52) U.S. Cl.
    CPC ................................. *G01C 19/5607* (2013.01)

(58) Field of Classification Search
    CPC .................................................... G01C 19/5607
    USPC ................................. 73/504.16; 310/367, 370
    See application file for complete search history.

(56) References Cited

U.S. PATENT DOCUMENTS

| | | | |
|---|---|---|---|
| 4,898,032 A | 2/1990 | Voles | |
| 6,134,962 A | 10/2000 | Sugitani | |
| 6,151,965 A | 11/2000 | Watarai | |
| 6,182,508 B1 | 2/2001 | Takeuchi et al. | |
| 6,490,925 B2 * | 12/2002 | Inoue et al. | 73/504.16 |
| 7,216,540 B2 * | 5/2007 | Inoue | G01C 19/5642 310/370 |
| 2001/0010173 A1 * | 8/2001 | Inoue | G01C 19/5607 73/504.16 |
| 2003/0168947 A1 * | 9/2003 | Kawashima | 310/370 |
| 2011/0140575 A1 * | 6/2011 | Nishizawa | 310/323.21 |
| 2012/0103095 A1 * | 5/2012 | Wada et al. | 73/514.34 |

FOREIGN PATENT DOCUMENTS

| | | |
|---|---|---|
| JP | 61-191916 | 8/1986 |
| JP | 62-106314 | 5/1987 |
| JP | 64-031015 | 2/1989 |
| JP | 09-329444 | 12/1997 |
| JP | 10-054723 | 2/1998 |
| JP | 10-170272 | 6/1998 |
| JP | 11-006738 A | 1/1999 |
| JP | 11-271066 A | 10/1999 |
| JP | 2001-082962 | 3/2001 |
| JP | 2002-039760 | 2/2002 |
| JP | 2003-021518 | 1/2003 |

(Continued)

*Primary Examiner* — Peter Macchiarolo
*Assistant Examiner* — Anthony W Megna Fuentes
(74) *Attorney, Agent, or Firm* — Harness, Dickey & Pierce, P.L.C.

(57) ABSTRACT

A vibration gyro element includes drive vibrating arms and detection vibrating arms at the opposite side, and has a first detection mode in which the drive vibrating arms flexurally vibrate oppositely to each other in an out-of-plane direction in an opposite phase to an action direction of Coriolis force and the detection vibrating arms flexurally vibrate oppositely to each other in the out-of-plane direction in an opposite phase to that of the drive vibrating arms, and a second detection mode in which the drive vibrating arms flexurally vibrate oppositely to each other in the out-of-plane direction in the same phase as the action direction of the Coriolis force and the detection vibrating arms flexurally vibrate oppositely to each other in the out-of-plane direction in the same phase as that of the drive vibrating arms.

12 Claims, 6 Drawing Sheets

(56) References Cited

FOREIGN PATENT DOCUMENTS

| JP | 2004-251663 | 9/2004 |
| JP | 2004-333416 | 11/2004 |
| JP | 2009-222475 | 10/2009 |
| JP | 2012-098091 | 5/2012 |

* cited by examiner

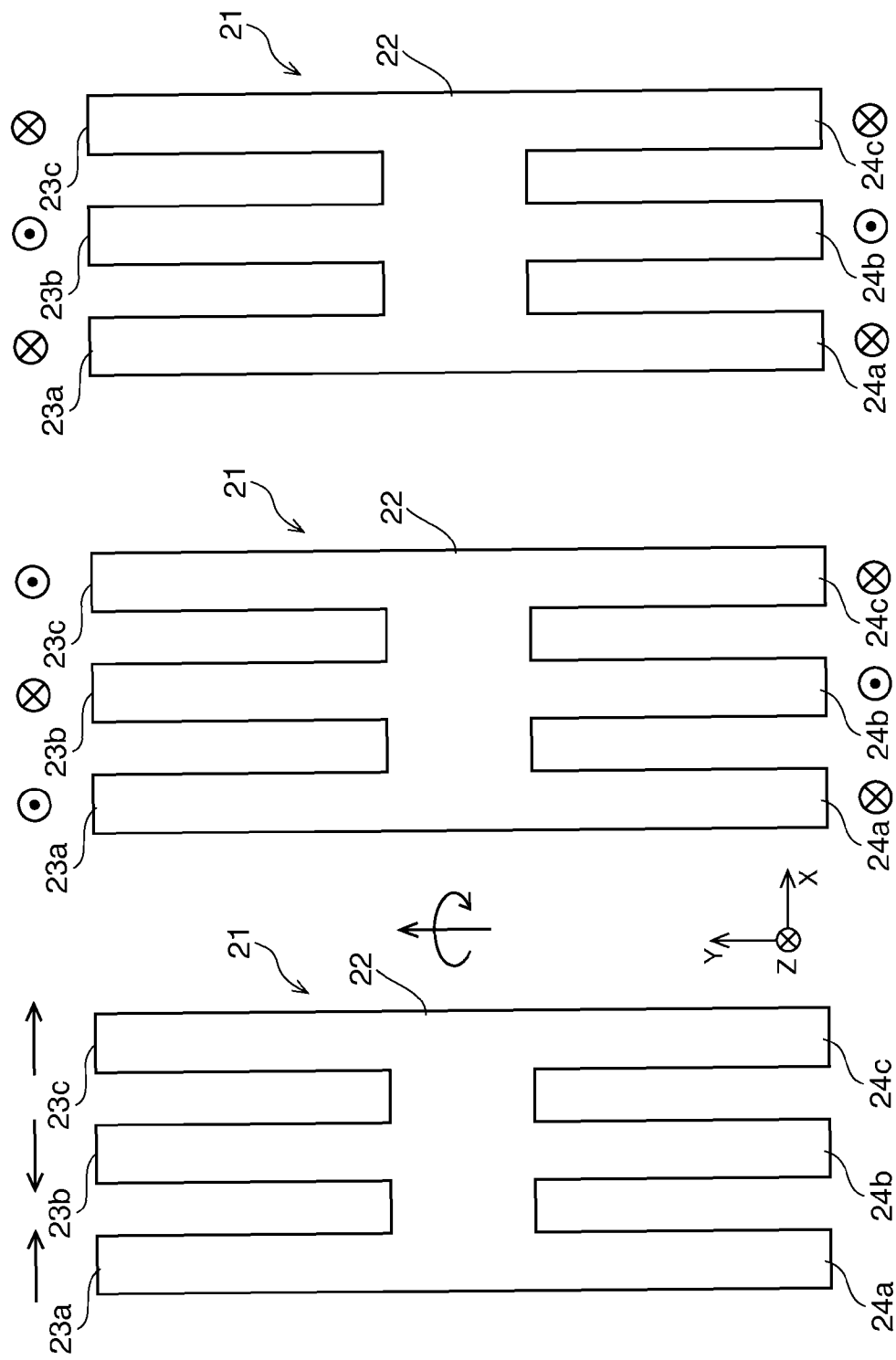

VIBRATION GYRO ELEMENT, GYRO SENSOR, AND ELECTRONIC APPARATUS

BACKGROUND

1. Technical Field

The present invention relates to a vibration gyro element using a flexing vibrating reed, and a gyro sensor and an electronic apparatus using the element.

2. Related Art

In related art, piezoelectric devices of piezoelectric vibrators, oscillators and real time clock modules with piezoelectric vibrating reeds and IC chips, etc. have been widely used as clock sources of electronic circuits for an electronic apparatus such as clocks, home appliances, various information and communication apparatuses, and an OA apparatus. Further, sensors of piezoelectric vibration gyros etc. using flexing vibrating reeds have been widely used for various electronic apparatuses such as digital still cameras, video cameras, navigation systems, vehicle position detectors, pointing devices, game controllers, cellular phones, and head-mounted displays for detection of physical quantities of angular velocities, angular acceleration, acceleration, forces, and the like.

For example, a transverse-vibration tuning bar gyro in which a piezoelectric ceramic for driving is bonded to one side surface of a vibrating arm (turning bar) having a square section and a piezoelectric ceramic for extraction is bonded to another adjacent side surface has been known (for example, see Patent Document 1 (JP-A-61-191916)). The turning bar flexurally vibrates in the X direction when a signal is applied to the piezoelectric ceramic for driving and flexurally vibrates in the Y direction by Coriolis force when rotating around the Z-axis, and thus, the angular velocity around the Z-axis may be detected from the output generated in the piezoelectric ceramic for extraction.

Further, an angular velocity sensor including a double-tuning fork vibrating reed formed by connecting two pairs of forked members as a driven pair and a sensing pair with a base has been known (for example, see Patent Document 2 (JP-A-64-31015)). It has been known that, in a vibration gyro including the double-tuning fork (H-shaped) vibrating reed, by setting a fixed relationship between the arm length and width of the vibrator and the length and width of the piezoelectric element, the second-order mode causing spurious offset output may be suppressed and highly stable detection may be performed (for example, see Patent Document 3 (JP-A-62-106314)). The vibration gyro drives and detects the vibrator using the piezoelectric element provided on the surface of the vibrator of a constant modulus alloy.

As a similar double-tuning fork vibrating reed, an angular velocity detector having two first vibrating reeds projecting from a base in the +Y direction, two second vibrating reeds projecting in the −Y direction, and a single support rod projecting from the center of the base has been known (for example, see Patent Document 4 (JP-A-10-54723)). When the first vibrating reeds vibrate in the in-plane X direction in opposite phases in the drive mode, and they rotate around the Y direction and the second vibrating reeds vibrate in the out-of-plane Z direction in the detection mode.

It has been known that, in the angular velocity sensor having the same structure as that in Patent Document 4, by determining the drive-vibration frequency and the detection-vibration frequency so that a leakage vibration may be generated in the same direction as that of Coriolis force in one vibrating reed and a leakage vibration may be generated in the opposite direction to that of the Coriolis force in the other vibrating reed, the electric signals due to the leakage vibrations are cancelled out and the detection accuracy of the angular velocity becomes better (for example, see Patent Document 5 (JP-A-9-329444)). In the angular velocity sensor, in the first vibration mode in which right and left and upper and lower vibrating reeds are horizontally and vertically opposite in phase, the third vibration mode in which the vibrating reeds are horizontally and vertically the same in phase, and the second vibration mode in which the vibrating reeds are horizontally opposite and vertically the same in phase, natural frequencies f1, f3, f2 of the respective vibration modes are set to be higher in this order by appropriately determining the dimensions of the respective parts of the H-shaped vibrator.

Furthermore, it has been known that, in the vibration gyro element, an unwanted vibration mode called a spurious mode as a fixed vibration mode different from the drive mode and detection mode is generated (for example, see Patent Document 6 (JP-A-2003-21518)). The vibration in the drive mode becomes stable by sufficiently separating the vibration frequency in the spurious mode from its vibration frequency.

A vibration gyro scope that may reduce temperature drift using the natural resonance frequency in the spurious mode has been proposed (for example, see Patent Document 7 (JP-A-2001-82962)). According to Patent Document 7, by bringing the difference $\Delta f$ between the natural resonance frequency fd of the vibration in the drive mode and the natural resonance frequency fp of the vibration in the detection mode closer to 1.7 times the difference $\Delta fs$ between the natural resonance frequency fd in the drive mode and the natural resonance frequency fs in the spurious mode, the temperature drift in the temperature range from −40° C. to +80° C. is significantly reduced.

Further, a vibrator of vibration gyro scope with reduced temperature drift by reducing the spurious detuning as the absolute value |fs−fd| of the difference (fs−fd) between the resonance frequency fd of the vibration in the drive vibration mode and the resonance frequency fs of the vibration in the spurious mode has been proposed (for example, see Patent Document 8 (JP-A-2004-333416)). According to Patent Document 8, the spurious detuning may be controlled by varying the masses and dimensions of the detection vibration unit and/or drive vibration unit to change the resonance frequencies in the spurious mode and/or drive vibration.

To increase the detection sensitivity in the vibration gyro element, it is necessary to make the exciting force acting on the detection vibrating arm larger and the amplitude larger. However, any of the above described vibration gyros in related art has only one vibration mode for detection, and it is not easy to improve the detection sensitivity by increasing the exciting force to the detection vibrating arm. Especially, as the vibration gyro element is made smaller in size, also the drive and detection vibrating arms are made smaller, and the improvement of the detection sensitivity by increasing the exciting force becomes more difficult.

SUMMARY

An advantage of some aspects of the invention is to improve a vibration gyro element including drive vibrating arms extending from a support part in juxtaposition and detection vibrating arms extending toward an opposite side to the drive vibrating arms in juxtaposition in detection sensitivity by increasing exciting force to the detection vibrating arms.

An aspect of the invention is directed to a vibration gyro element including a support part, drive vibrating arms extending from the support part in juxtaposition, and detection vibrating arms being the same as the drive vibrating arms and extending from the support part toward an opposite side to the drive vibrating arms in juxtaposition, and the vibration gyro element has a drive mode in which the adjacent drive vibrating arms flexurally vibrate oppositely to each other in an in-plane direction along front and rear principal surfaces thereof, a first detection mode in which, by Coriolis force acting due to rotation of the vibrating arms around the extension directions, the drive vibrating arms flexurally vibrate oppositely to each other among the adjacent vibrating arms in an opposite phase to an action direction of the Coriolis force in an out-of-plane direction crossing the front and rear principal surfaces thereof and the detection vibrating arms flexurally vibrate oppositely to each other among the adjacent vibrating arms in an opposite phase to that of the drive vibrating arms in the out-of-phase direction, and a second detection mode in which the drive vibrating arms flexurally vibrate oppositely to each other among the adjacent vibrating arms in the same phase as the action direction of the Coriolis force in the out-of-plane direction crossing the front and rear principal surfaces thereof and the detection vibrating arms flexurally vibrate oppositely to each other among the adjacent vibrating arms in the same phase as that of the drive vibrating arms in the out-of-plane direction, wherein the respective detection vibrating arms flexurally vibrate in the same phase in the first detection mode and the second detection mode.

According to the configuration, the respective vibrating arms of the vibration gyro element flexurally vibrate in a vibration mode formed by superimposition of the first and second detection modes. The exciting force further increases and amplitudes become larger than those in the case where the respective detection vibrating arms vibrate in only one of the first and second modes. Therefore, a higher voltage is output from the detection electrode in either of the detection vibrating arms, and the rotation and the angular velocity or the like of the vibration gyro element may be obtained with the higher detection sensitivity.

Another aspect of the invention is directed to a vibration gyro element including a support part, drive vibrating arms extending from the support part in juxtaposition, and detection vibrating arms being the same as the drive vibrating arms and extending from the support part toward an opposite side to the drive vibrating arms in juxtaposition, and the vibration gyro element has a drive mode in which the adjacent drive vibrating arms flexurally vibrate oppositely to each other in an in-plane direction along front and rear principal surfaces thereof at a predetermined drive resonance frequency fd, a first detection mode in which, by Coriolis force acting due to rotation of the vibrating arms around the extension directions, the drive vibrating arms flexurally vibrate oppositely to each other among the adjacent vibrating arms in an opposite phase to an action direction of the Coriolis force in an out-of-plane direction crossing the front and rear principal surfaces thereof and the detection vibrating arms flexurally vibrate oppositely to each other among the adjacent vibrating arms in an opposite phase to that of the drive vibrating arms in the out-of-phase direction at a predetermined first detection resonance frequency fp1, and a second detection mode in which the drive vibrating arms flexurally vibrate oppositely to each other among the adjacent vibrating arms in the same phase as the action direction of the Coriolis force in the out-of-plane direction crossing the front and rear principal surfaces thereof and the detection vibrating arms flexurally vibrate oppositely to each other among the adjacent vibrating arms in the same phase as that of the drive vibrating arms in the out-of-plane direction at a predetermined second detection resonance frequency fp2, wherein the resonance frequencies fd, fp1, fp2 fulfill relationships of $fp1 < fd < fp2$, and $0.7 \times (fd - fp1) \times fp2 - fd \leq 1.3 (fd - fp1)$.

By setting the resonance frequencies fd, fp1, fp2 in the above described manner, the respective detection vibrating arms flexurally vibrate in the same phase in the first detection mode and the second detection mode and the exciting force acting on the respective detection vibrating arms is increased by the vibration in the first and second detection modes, and the detection sensitivity may be improved.

In one embodiment, a width Wb of the support part with respect to a length Ld of the drive vibrating arms is set in a range of $Wb/Ld \geq 2$, and thereby, the detection sensitivity of the vibration gyro element may be amplified to 1.15 times or more.

In another embodiment, the width Wb of the support part with respect to the length Ld of the drive vibrating arms is set in a range of $Wb/Ld \geq 2.5$, and thereby, the detection sensitivity of the vibration gyro element may be amplified to 1.25 times or more.

According to still another embodiment, the width Wb of the support part with respect to the length Ld of the drive vibrating arms is set in a range of $Wb/Ld \geq 3.3$, and thereby, the detection sensitivity of the vibration gyro element may be amplified to 1.35 times or more.

Further, in yet another embodiment, a detection detuning frequency $\Delta fd$ as a difference between the first detection resonance frequency fp1 and the drive resonance frequency fd and a spurious detuning frequency $\Delta fs$ as a difference between the second detection resonance frequency fp2 and the drive resonance frequency fd are set to fulfill $|\Delta fd - \Delta fs| \leq 40000$ in units of ppm (parts per million), and thereby, the detection sensitivity of the vibration gyro element may be amplified to 1.15 times or more.

In still yet another embodiment, the detection detuning frequency $\Delta fd$ and the spurious detuning frequency $\Delta fs$ are set to fulfill $|\Delta fd - \Delta fs| \leq 13000$ in units of ppm, and thereby, the detection sensitivity of the vibration gyro element may be amplified to 1.25 times or more.

According to further another embodiment, the detection detuning frequency $\Delta fd$ and the spurious detuning frequency $\Delta fs$ are set to fulfill $|\Delta fd - \Delta fs| \leq 1000$ in units of ppm, and thereby, the detection sensitivity of the vibration gyro element may be amplified to 1.35 times or more.

According to still another aspect of the invention, with the vibration gyro element of the aspect of the invention, a gyro sensor with higher detection sensitivity may be provided.

According to yet another aspect of the invention, with the vibration gyro element of the aspect of the invention, an electronic apparatus with higher performance and higher accuracy including a sensor device such as a gyro sensor with higher detection sensitivity may be provided.

BRIEF DESCRIPTION OF THE DRAWINGS

The invention will be described with reference to the accompanying drawings, wherein like numbers reference like elements.

FIG. 6A is a plan view showing a vibration gyro element of a second embodiment of the invention and a vibration mode in a drive mode thereof, and FIGS. 6B and 6C are explanatory diagrams respectively showing vibration modes in first and second detection modes thereof.

DESCRIPTION OF EXEMPLARY EMBODIMENTS

As below, preferred embodiments of the invention will be explained with reference to the accompanying drawings. Note that, in the accompanying drawings, the same and similar component elements have the same or similar reference signs.

Figure 1:
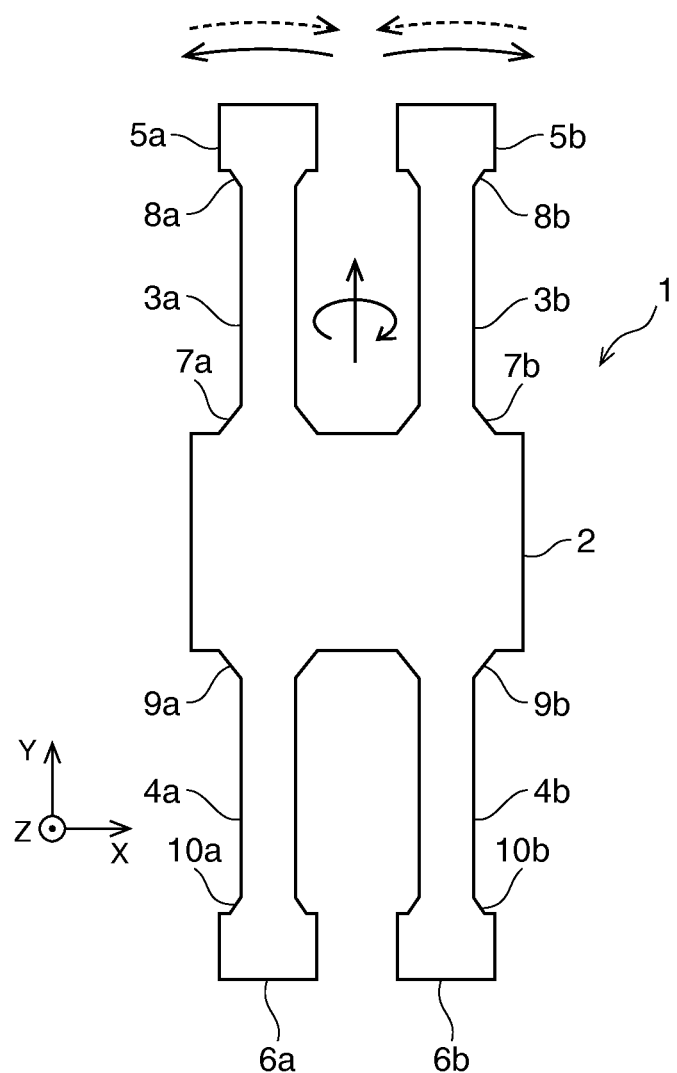
FIG. 1 is a plan view showing a vibration gyro element of a first embodiment of the invention and a vibration mode in a drive mode thereof.

FIG. 1 schematically shows a vibration gyro element 1 of a first embodiment of the invention used for an angular velocity sensor, for example. The vibration gyro element 1 includes a double-tuning fork vibrating reed and has a support part 2 having a nearly rectangular shape at the center, a pair of drive vibrating arms 3a, 3b extending from the support part toward one side in juxtaposition in parallel, and a pair of detection vibrating arms 4a, 4b extending to the opposite side in juxtaposition in parallel. Spindle parts 5a, 5b, 6a, 6b are provided at ends of the respective vibrating arms so that, even when their lengths are made shorter, generation in higher order vibration modes may be suppressed and the vibration frequencies may be stabilized. Tapered parts 7a, 7b, 8a, 8b narrower toward the vibrating arm sides are formed at both right and left sides in connection parts between the respective drive vibrating arms 3a, 3b and the support part 2 and the spindle parts 5a, 5b, respectively. Similarly, tapered parts 9a, 9b, 10a, 10b narrower toward the vibrating arm sides are formed at both right and left sides in connection parts between the respective detection vibrating arms 4a, 4b and the support part 2 and the spindle parts 6a, 6b, respectively.

On the drive vibrating arms 3a, 3b, drive electrodes (not shown) are formed for flexural vibration of the drive vibrating arms along the front and rear principal surfaces thereof, for example, within the XY plane in parallel to the principal surfaces in the drive mode. On the detection vibrating arms 4a, 4b, detection electrodes (not shown) are formed for detection of a potential difference generated when the detection vibrating arms flexurally vibrate in the Z-axis direction crossing the front and rear principal surfaces thereof, for example, perpendicular to the principal surfaces in the detection mode. In the drive mode, when predetermined alternating-current voltages are applied to the drive electrodes, the drive vibrating arms 3a, 3b flexurally vibrate oppositely to each other, i.e., to move toward and away from each other within the XY plane as shown by arrows in FIG. 1.

Under the condition, when the vibration gyro element 1 rotates around the Y-axis in the longitudinal direction, the drive vibrating arms flexurally vibrate oppositely, i.e., in opposite phases to each other in the out-of-plane direction perpendicular to the principal surfaces, i.e., in the Z-axis direction by the action of Coriolis force generated in response to the angular velocity. In resonance with them, in the detection mode, the detection vibrating arms 4a, 4b flexurally vibrate similarly oppositely to each other in the Z-axis direction.

Figures 2A, 2B:
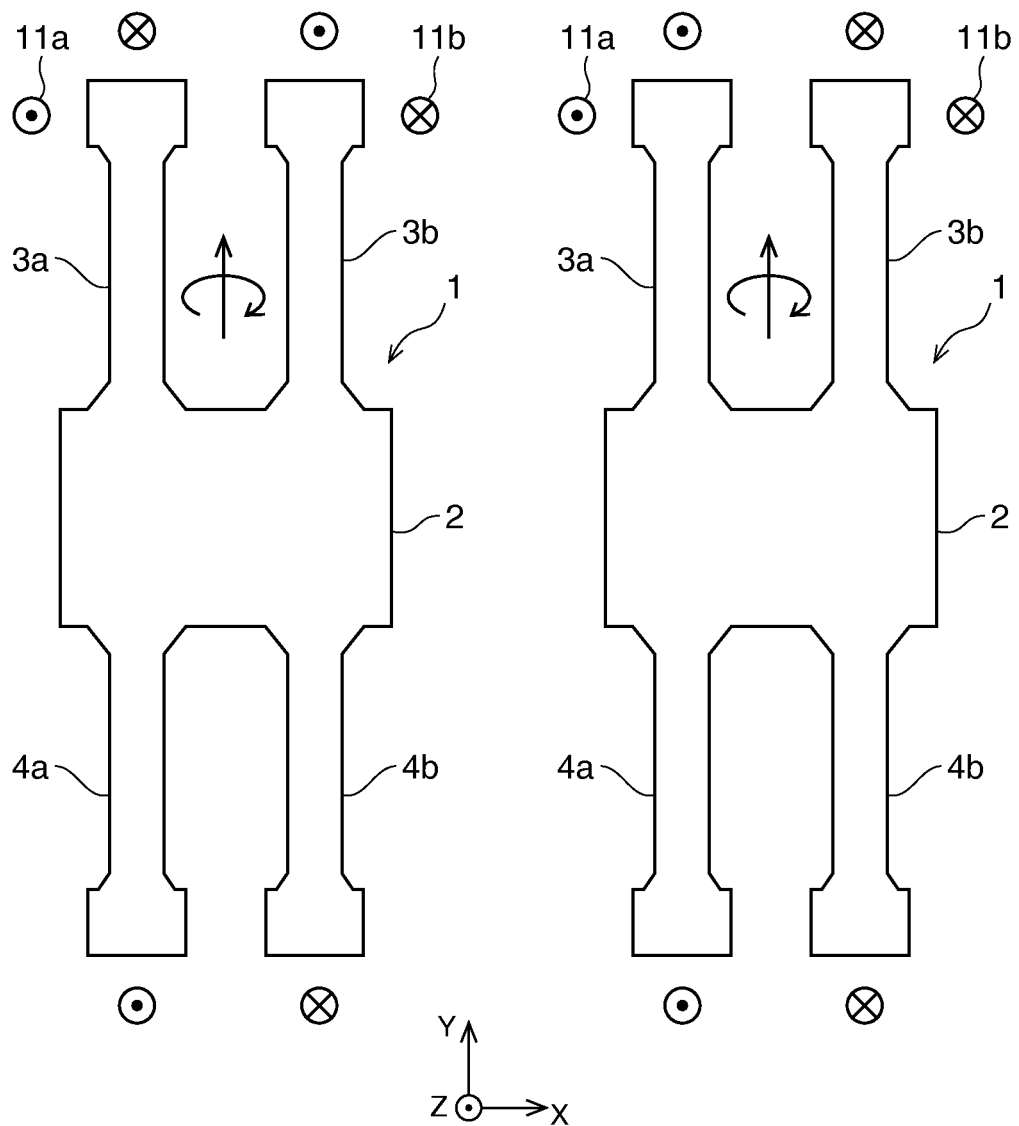
FIGS. 2A and 2B are explanatory diagrams respectively showing vibration modes in first and second detection modes of the vibration gyro element in FIG. 1.

The vibration gyro element 1 of the embodiment has two detection modes. In the first detection mode, as shown in FIG. 2A, the drive vibrating arms 3a, 3b flexurally vibrate in opposite phases with respect to action directions 11a, 11b of Coriolis force oppositely to each other in the out-of-plane direction, i.e., in the Z-axis direction. Thereby, the detection vibrating arms 4a, 4b flexurally vibrate oppositely to each other among the adjacent vibrating arms in the opposite phase to that of the drive vibrating arms 3a, 3b in the Z-axis direction. Generally, this is a vibration mode typically used for detection of an angular velocity or the like in the vibration gyro element.

In the second detection mode, as shown in FIG. 2B, the drive vibrating arms 3a, 3b flexurally vibrate in the same phase with respect to the action directions 11a, 11b of the Coriolis force oppositely to each other in the Z-axis direction. Thereby, the detection vibrating arms 4a, 4b flexurally vibrate oppositely to each other among the adjacent vibrating arms in the same phase as that of the drive vibrating arms 3a, 3b in the Z-axis direction. Generally, this is a vibration mode eliminated as unwanted spurious vibration for detection of an angular velocity or the like.

As a result, the respective vibrating arms of the vibration gyro element 1 flexurally vibrate in a vibration mode formed by superimposition of the first and second detection modes. The respective drive vibrating arms 3a, 3b flexurally vibrate in opposite phases respectively in the first detection mode and the second detection mode. On the other hand, the respective detection vibrating arms 4a, 4b flexurally vibrate in the same phase respectively in the first detection mode and the second detection mode, and thus, the exciting force further increases and amplitudes become larger than those in the case where they vibrate in only one of the first and second modes. Therefore, with either of the detection vibrating arm 4a or 4b, an electric signal at the higher voltage may be obtained from the detection electrode, and the rotation and the angular velocity or the like of the vibration gyro element 1 may be obtained with the higher detection sensitivity.

Here, a drive resonance frequency at which the drive vibrating arms 3a, 3b flexurally vibrate in the in-plane direction in the drive mode is fd, a first detection resonance frequency at which the detection vibrating arms 4a, 4b flexurally vibrate in the first detection mode is fp1, and a second detection resonance frequency at which the detection vibrating arms flexurally vibrate in the second detection mode is fp2. According to the embodiment, the drive, the first detection, and the second detection resonance frequencies are set to fulfill fp1<fd<fp2. Thereby, the above described first detection mode and second detection mode may be simultaneously produced.

The detection sensitivity G of the vibration gyro element 1 was measured with the drive resonance frequency fd=50 kHz while the first and second detection resonance frequencies fp1, fp2 are changed around the drive resonance frequency fd. The detection sensitivity G is expressed by G=Vs/ω (mV/dps) where a rotation angular velocity around the Y-axis of the vibration gyro element 1 is ω (dps) and a potential difference generated between the detection electrodes of the detection vibrating arms 4a, 4b is Vs (mV). The measurement results are shown in the following Table 1.

TABLE 1

|  | Drive mode frequency fd (kHz) | Detection mode 1 frequency fp1 (kHz) | Detection mode 2 frequency fp2 (kHz) | Sensitivity G (mV/dps) |
|---|---|---|---|---|
| Embodiment 1 | 50 | 48 | 52 | 5 |
| Embodiment 2 | 50 | 49 | 51 | 10 |
| Embodiment 3 | 50 | 49 | 55 | 7 |
| Comparative example 1 | 50 | 48 | 49 | −3 |
| Comparative example 2 | 50 | 51 | 52 | −4 |
| Comparative example 3 | 50 | 51 | 60 | −5 |

In Table 1, Embodiments 1 to 3 show detection sensitivity G of the vibration gyro element 1 of the embodiment. On the other hand, Comparative Examples 1 to 3 show detection sensitivity G in the case where the first and second detection resonance frequencies fp1, fp2 were set to one of the positive side and the negative side with respect to the drive resonance frequency fd. As shown in the same table, by setting the drive, the first detection, and the second detection resonance frequencies to fulfill fp1<fd<fp2 and bringing fp1 and fp2 closer to fd from both the positive and negative sides, respectively, the detection sensitivity became higher.

Especially, when a detection detuning frequency Δfd=|fd−fp1| as a difference between the first detection resonance frequency fp1 and the drive resonance frequency fd and a spurious detuning frequency Δfs=|fd−fp2| as a difference between the second detection resonance frequency fp2 and the drive resonance frequency fd were respectively set to 1 kHz, the detection sensitivity G became the maximum. From the measurement results, according to the embodiment, when the following relation is fulfilled, the higher detection sensitivity is obtained.

$$0.7 \times (fd-fp1) \le fp2-fd \le 1.3 \times (fd-fp1)$$

Figure 3:
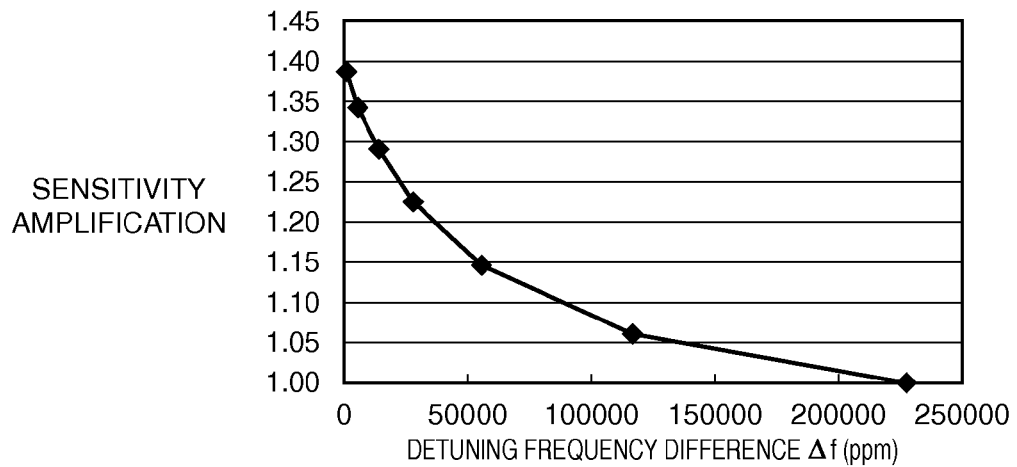
FIG. 3 is a diagram showing a relationship between a detuning frequency difference and detection sensitivity amplification of the first embodiment.

In addition, the relationship between the detuning frequency difference Δf=|Δfd−Δfs| between the detection detuning frequency Δfd and the spurious detuning frequency Δfs and the amplification of the detection sensitivity was simulated. FIG. 3 shows the simulation result. In the same drawing, the horizontal axis indicates the detuning frequency difference Δf in units of ppm in a range of Δf=861 to 227865 (ppm). The vertical axis indicates the amplification of the detection sensitivity of the embodiment relative to the detection sensitivity in the typical case using only the first detection mode.

As shown in the same drawing, as the detuning frequency difference Δf is smaller, the amplification of the detection sensitivity is higher, that is, the detection sensitivity is significantly higher. In the same drawing, with the drive resonance frequency fd=50.581 kHz, the first detection resonance frequency fp1=49.076 kHz, and the second detection resonance frequency fp2=52.042 kHz, the amplification of the detection sensitivity became the maximum with the detuning frequency difference Δf=861 ppm.

From the simulation result, with the detuning frequency difference Δf=|Δfd−Δfs|≤40000 (ppm), the detection sensitivity amplification equal to or more than 1.15 was obtained. Further, it has been known that the detection sensitivity 1.25 times or more than usual with the detuning frequency difference Δf≤13000 may be obtained, and the detection sensitivity 1.35 times or more than usual with the detuning frequency difference Δf≤1000 may be obtained.

The second detection resonance frequency fp2 in the second detection mode, i.e., the spurious mode may be changed by varying the dimensions at the detection side of the vibration gyro element 1, for example, the width of the detection vibrating arms 4a, 4b or the width of the support part 2 from which the vibrating arms extend. As the width of the detection vibrating arms is made smaller, the second detection resonance frequency fp2 becomes higher. As the width of the support part 2 is made larger, the second detection resonance frequency fp2 becomes lower.

Figure 4:
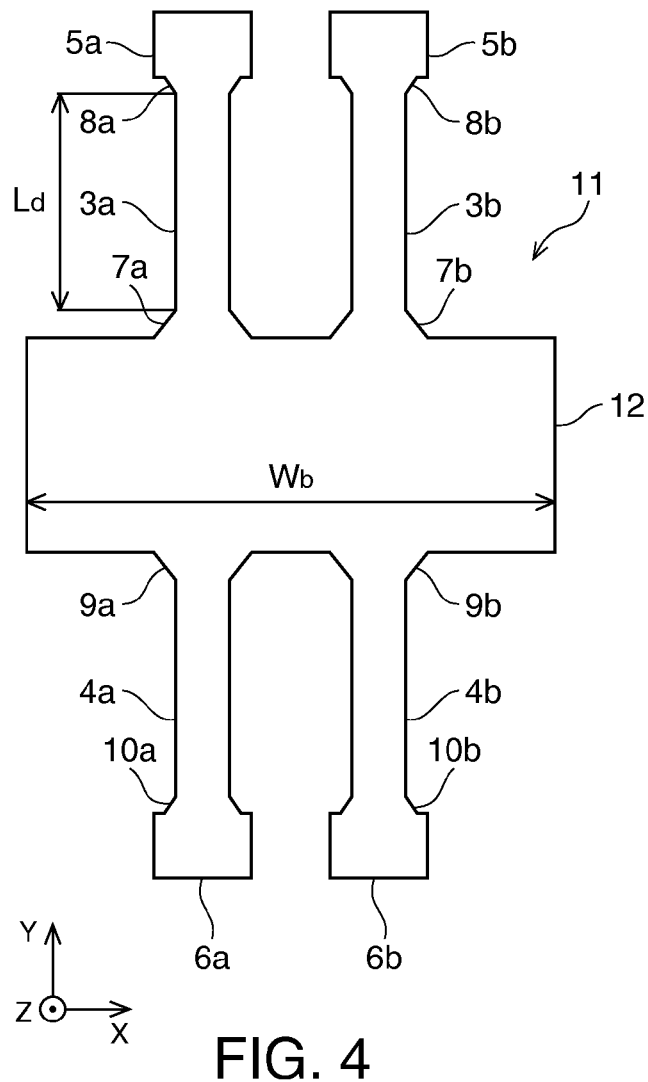
FIG. 4 is a plan view of a vibration gyro element of a modified example of the first embodiment.

FIG. 4 shows a vibration gyro element 11 of a modified example formed by increasing the width of the support part 2 of the first embodiment. In the vibration gyro element 11, changes of the detection sensitivity amplification with respect to the dimension ratio between the length Ld of the drive vibrating arms 3a, 3b and the width Wb of a support part 12 were simulated. The length Ld of the drive vibrating arms was set to a length of parts formed by subtraction of the lengths of the spindle parts 5a, 5b and the tapered parts 7a, 7b, 8a, 8b from the entire length of the vibrating arms, which directly determine the resonance frequency as shown in FIG. 4.

Figure 5:
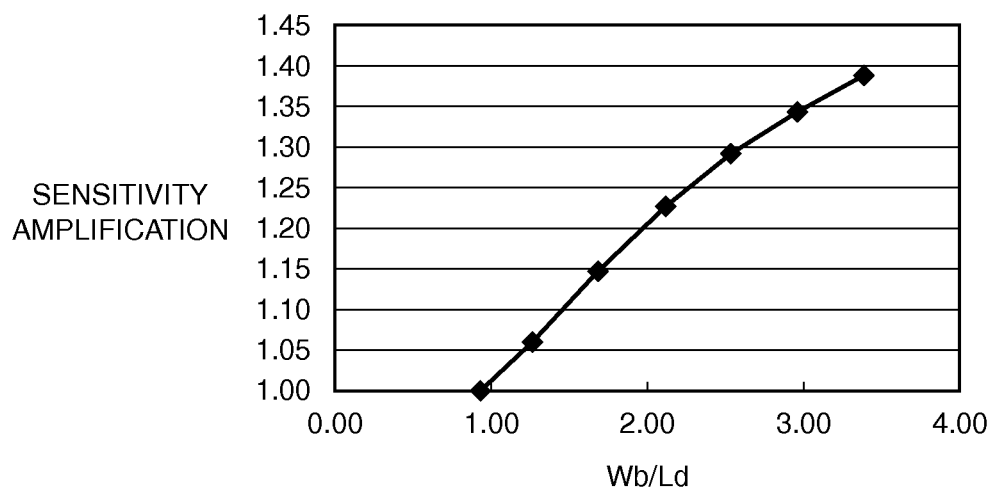
FIG. 5 is a diagram showing a relationship between a dimension ratio of a width of a support part to a length of a drive vibrating arm and detection sensitivity amplification in the modified example in FIG. 4.

FIG. 5 shows a simulation result thereof. In the same drawing, the horizontal axis indicates the dimension ratio in a range of Wb/Ld=0.93 to 3.39 with the length Ld of the drive vibrating arms and the length of the support part 12 constant and the support part width Wb changed. The vertical axis indicates the amplification of the detection sensitivity of the embodiment relative to the detection sensitivity in the typical case where only the first detection mode is similarly used. As shown in the same drawing, as the dimension ratio Wb/Ld was larger, that is, the support part width Wb was larger, the amplification of the detection sensitivity became higher substantially linearly and the detection sensitivity became significantly higher.

From the simulation result, with the dimension ratio Wb/Ld≥2.0, the detection sensitivity amplification equal to or more than 1.15 was obtained. Further, it has been known that the detection sensitivity 1.25 times or more than usual with the dimension ratio Wb/Ld≥2.5 may be obtained, and the detection sensitivity 1.35 times or more than usual with the dimension ratio Wb/Ld≥3.3 may be obtained.

The invention may be similarly applied to a vibration gyro element having two or more drive vibrating arms and detection vibrating arms.

FIGS. 6A to 6C schematically show a vibration gyro element 21 including a three-legged flexural vibrating reed as a second embodiment of the invention. The vibration gyro element 21 has a rectangular support part 22, three drive vibrating arms 23a to 23c extending from the support part in juxtaposition in parallel, and three detection vibrating arms 24a to 24c extending toward an opposite side in juxtaposition in parallel. Also, in the embodiment, the same spindle parts and tapered parts as the spindle parts 5a to 6a, 5b to 6b and the tapered parts 7a to 10a, 7b to 10b of the first embodiment may be provided in the respective vibrating arms.

On the drive vibrating arms 23a to 23c, drive electrodes (not shown) are formed for flexural vibration of the drive vibrating arms along the front and rear principal surfaces thereof, for example, within the XY plane in parallel to the principal surfaces in the drive mode. On the detection vibrating arms 24a to 24c, detection electrodes (not shown) are formed for detection of a potential difference generated when the detection vibrating arms flexural vibrate in the Z-axis direction crossing the front and rear principal surfaces thereof, for example, perpendicular to the principal surfaces in the detection mode. In the drive mode, when predetermined alternating-current voltages are applied to the drive electrodes, the drive vibrating arms 23a to 23c flexurally vibrate oppositely to each other among the adjacent vibrating arms, i.e., to move toward and away from each other within the XY plane as shown by arrows in FIG. 6A.

Under the condition, when the vibration gyro element 21 rotates around the Y-axis in the longitudinal direction, the drive vibrating arms flexurally vibrate oppositely to each other, i.e., in opposite phases to each other in the out-of-plane direction perpendicular to the principal surfaces, i.e., in the Z-axis direction by the action of Coriolis force generated in response to the angular velocity. In resonance with them, in the detection mode, the detection vibrating arms 24a to 24c flexurally vibrate similarly oppositely to each other in the Z-axis direction.

The vibration gyro element 21 of the embodiment similarly has two detection modes. In the first detection mode, as shown in FIG. 6B, the drive vibrating arms 23a to 23c flexurally vibrate in the Z-axis direction, and the drive vibrating arms 23a, 23c at both right and left sides with respect to the action direction of the Coriolis force flexurally vibrate in the same phase and the vibrating arm 23b at the center flexurally vibrates in the opposite phase. Thereby, the detection vibrating arms 24a to 24c flexurally vibrate in the Z-axis direction in opposite phases to those of the drive vibrating arms 23a to 23c respectively corresponding thereto in the vertical direction in the drawing. Generally, this is a vibration mode typically used for detection of an angular velocity or the like in the vibration gyro element.

In the second detection mode, as shown in FIG. 6C, the drive vibrating arms 23a to 23c flexurally vibrate in the Z-axis direction, and the drive vibrating arms 23a, 23c at both right and left sides with respect to the action direction of the Coriolis force flexurally vibrate in the opposite phases and the vibrating arm 23b at the center flexurally vibrates in the same phase. Thereby, the detection vibrating arms 24a to 24c flexurally vibrate in the Z-axis direction in the same phases as those of the drive vibrating arms 23a to 23c respectively corresponding thereto in the vertical direction in the drawing. Generally, this is a vibration mode eliminated as unwanted spurious vibration for detection of an angular velocity or the like.

As a result, the respective vibrating arms of the vibration gyro element 21 flexurally vibrate in a vibration mode formed by superimposition of the first and second detection modes. The respective drive vibrating arms 23a to 23c flexurally vibrate in opposite phases respectively in the first detection mode and the second detection mode. On the other hand, the respective detection vibrating arms 24a to 24c flexurally vibrate in the same phases respectively in the first detection mode and the second detection mode, and thus, amplitudes become larger than those in the case where they vibrate in only one of the first and second modes. Therefore, in any one of the detection vibrating arms, an electric signal at the higher voltage may be obtained from the detection electrode, and the rotation and the angular velocity or the like of the vibration gyro element 21 may be obtained with the higher detection sensitivity.

The vibration gyro elements of the respective embodiments may be manufactured with high accuracy using the following processing method from a crystal wafer, for example. First, metal films having two-layer structures in which Au is stacked on Cr, for example, are formed on the entire front and rear surfaces of the crystal wafer, a photoresist is applied thereto, exposed to light, and developed, and thereby, resist patterns corresponding to the outer shape of the vibration gyro element 1 are formed. The metal films exposed from the resist patterns are wet-etched and metal patterns are formed on both the front and rear surfaces of the crystal wafer.

Figure 7A:
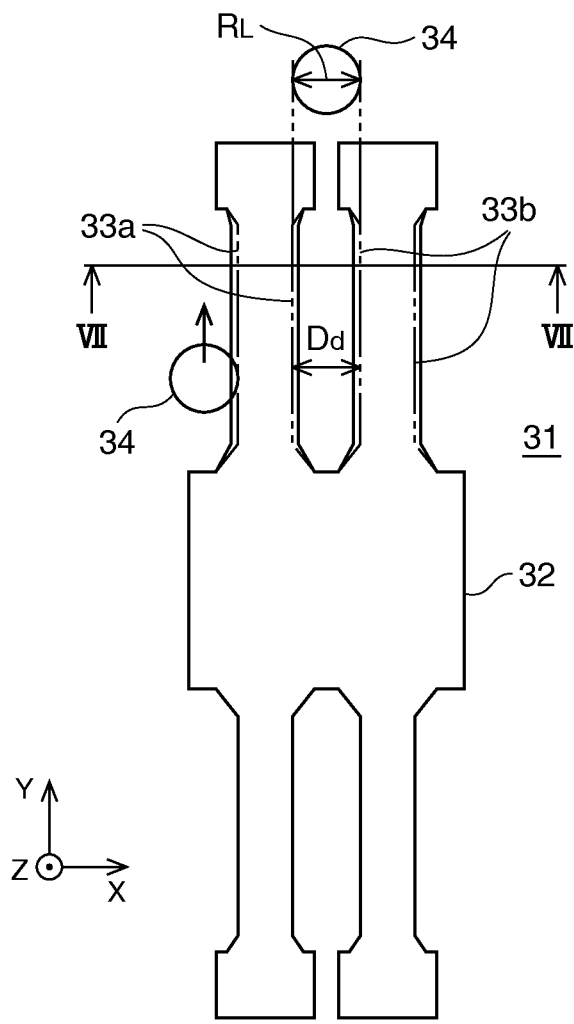
FIG. 7A is a plan view showing a metal mask formed on a crystal wafer in a manufacturing process of the vibration gyro element in FIG. 1.
Figure 7B:
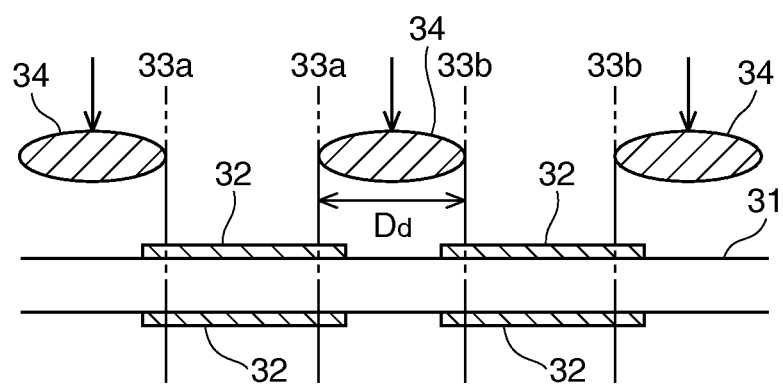
FIG. 7B is an enlarged sectional view along VII-VII line thereof.

FIGS. 7A and 7B show a metal pattern 32 formed on both front and rear surfaces of a crystal wafer 31. In the same drawings, imaginary lines 33a, 33b show the right and left sides except the spindle parts 5a to 6a, 5b to 6b, and the tapered parts 7a to 10a, 7b to 10b from the drive vibrating arms 3a, 3b of the vibration gyro element 1. The metal pattern 32 is formed so that the parts corresponding to the right and left sides 33a, 33b of the drive vibrating arms 3a, 3b may be slightly wider than desired positions toward the outside.

Then, as shown in FIG. 7B, a laser beam 34 is applied to one of the front surface or the rear surface of the crystal wafer 31 for ablation of only the parts corresponding to the right and left sides 33a, 33b of the drive vibrating arms 3a, 3b. The laser beam is transmitted through the transparent and thin crystal wafer 31, and thus, the metal patterns 32, 32 on both the front and rear surfaces of the wafer may be precisely processed simultaneously without substantial misalignment between the front and rear surfaces.

Specifically, it is preferable that a distance Dd between the right and left drive vibrating arms 3a, 3b is made equal to a spot diameter RL of the laser beam 34 as shown in FIG. 7A. Thereby, only by scanning the laser beam 34 once in one direction along the adjacent sides 33a, 33b of the drive vibrating arms, the parts of the metal patterns 32, 32 on both the front and rear surfaces corresponding to both sides may be simultaneously processed.

Then, the crystal wafer is wet-etched using thus processed metal patterns as masks, and thereby, an element piece having the outer shape of the vibration gyro element 1 is formed. Electrode films are attached to the surface of the obtained element piece, patterning is performed using a photo-etching technology, and the drive electrodes, the detection electrodes, wires led out from the electrodes, etc. are formed.

According to the embodiment, the front and rear surfaces may be correctly aligned with respect to the parts of the metal patterns 32, 32 of both the front and rear surfaces corresponding to the right and left sides 33a, 33b of the drive vibrating arms in this manner. Thus, the drive vibrating arms 3a, 3b may be processed in section shapes near desired rectangular shapes. Further, only the particular parts of the metal patterns 32, 32 of both the front and rear surfaces are processed by the laser beam, and thus, as the whole process, the processing time may be significantly shortened and the processing cost may be reduced compared to the case where the entire metal patterns are processed using a laser beam.

The invention is not limited to the above described embodiments, but may be performed with additional various modifications or alternations within the technical range. For example, the vibration gyro element of the invention may be formed not only from the crystal but also from a piezoelectric material such as a piezoelectric single crystal of lithium tantalate, niobium tantalate, or the like, a piezoelectric ceramics of lead zirconate titanate or the like, or a silicon semiconductor material. Further, the vibration gyro element of the invention is not limited to the piezoelectric drive system using the piezoelectric element as described above, but elements of various drive systems such as an electrostatic drive system using electrostatic attractive force, a magnetic drive system using electromagnetic force (Lorentz force), and a system of driving using Coulomb force by application of an alternating-current voltage may be employed.

Furthermore, the invention may be applied to a gyro sensor by mounting the vibration gyro element on an appropriate package or the like. In addition, by mounting the gyro sensor, the invention may be widely applied to an electronic apparatus such as digital still cameras, video cameras, navigation systems, vehicle body position detectors, pointing devices, game controllers, cellular phones, and head-mounted displays.

The entire disclosure of Japanese Patent Application No. 2011-159612, filed Jul. 21, 2011 is expressly incorporated by reference herein.

What is claimed is:

1. A vibration gyro element comprising: a support part; a first drive vibrating arm, a second drive vibrating arm and a third drive vibrating arm extending from the support part in juxtaposition to each other in this order; and a first detection vibrating arm, a second detection vibrating arm and a third detection vibrating arm extending from the support part toward an opposite side from the first through third drive vibrating arms in juxtaposition to each other in this order, wherein the vibration gyro element having a drive mode in which the first and second drive vibrating arms flexurally vibrate oppositely to each other and the second and third drive vibrating arms flexurally vibrate oppositely to each other in an in-plane direction along front and rear principal surfaces thereof at a predetermined drive resonance frequency fd, a first detection mode in which, by Coriolis force acting due to rotation around extension directions of the first through third drive vibrating arms, the first and second drive vibrating arms flexurally vibrate oppositely to each other in an out-of-plane direction crossing the front and rear principal surfaces thereof, the second and third drive vibrating arms flexurally vibrate oppositely to each other in the out-of-plane direction, the first and second detection vibrating arms flexurally vibrate oppositely to each other in the out-of-plane direction, the second and third detection vibrating arms flexurally vibrate oppositely to each other in the out-of-plane direction, the first detection vibrating arm flexurally vibrates in an opposite phase to that of the first drive vibrating arm, the second detection vibrating arm flexurally vibrates in an opposite phase to that of the second drive vibrating arm, and the third detection vibrating arm flexurally vibrates in an opposite phase to that of the third drive vibrating arm at a predetermined first detection resonance frequency $fp1$, and a second detection mode in which the first and second drive vibrating arms flexurally vibrate oppositely to each other in the out-of-plane direction thereof, the second and third drive vibrating arms flexurally vibrate oppositely to each other in the out-of-plane direction, the first and second detection vibrating arms flexurally vibrate oppositely to each other in the out-of-plane direction, the second and third detection vibrating arms flexurally vibrate oppositely to each other in the out-of-plane direction, the first detection vibrating arm flexurally vibrates in the same phase as that of the first drive vibrating arm, the second detection vibrating arm flexurally vibrates in the same phase as that of the second drive vibrating arm, and the third detection vibrating arm flexurally vibrates in the same phase as that of the third drive vibrating arm at a predetermined second detection resonance frequency $fp2$, wherein the predetermined drive resonance frequency $fd$, the predetermined first detection resonance frequency $fp1$ and the predetermined second detection resonance frequency $fp2$ fulfill: $fp1<fd<fp2$, and $0.7\times(fd-fp1)\leq fp2-fd\leq 1.3\times(fd-fp1)$.

2. The vibration gyro element according to calim 1, wherein a width Wb of the support part with respect to a length Ld of at least two of the first through third drive vibrating arms is set in a range of $Wb/Ld \geq 2$.

3. The vibration gyro element according to claim 2, wherein the width Wb of the support part with respect to a length Ld of at least two of the first through third drive vibrating arms is set in a range of $Wb/Ld \geq 2.5$.

4. The vibration gyro element according to claim 3, wherein the width Wb of the support part with respect to a length Ld of at least two of the first through third drive vibrating arms is set in a range of $Wb/Ld \geq 3.3$.

5. A gyro sensor comprising the vibration gyro element according to claim 1.

6. A gyro sensor comprising the vibration gyro element according to claim 2.

7. A gyro sensor comprising the vibration gyro element according to claim 3.

8. A gyro sensor comprising the vibration gyro element according to claim 4.

9. An electronic apparatus comprising the vibration gyro element according to claim 1.

10. An electronic apparatus comprising the vibration gyro element according to claim 2.

11. An electronic apparatus comprising the vibration gyro element according to claim 3.

12. An electronic apparatus comprising the vibration gyro element according to claim 4.

* * * * *